UNITED STATES PATENT OFFICE.

EUGENE A. CROCKER, OF LONGMONT, COLORADO, ASSIGNOR OF ONE-HALF TO THEODORE PEASE, OF ENFIELD, CONNECTICUT.

PROCESS OF SEPARATING METALS FROM ORES.

SPECIFICATION forming part of Letters Patent No. 240,098, dated April 12, 1881.

Application filed February 10, 1881. (No specimens.)

*To all whom it may concern:*

Be it known that I, EUGENE A. CROCKER, of Longmont, in the county of Boulder and State of Colorado, have invented an Improved Process of Separating Metals from Ores; and I hereby declare that the following is a full, clear, and exact description thereof.

The object of my invention is to simplify the operation and materially reduce the expense of extracting metals, especially gold and silver, from their ores, whereby I am enabled to save the small particles of metal, and profitably utilize poor grades of ores which are now discarded on account of the cost incident to the present means employed in their extraction.

I first place the ground or comminuted metal-bearing ore in a strong tightly-closed vessel revolving on a horizontal shaft or trunnions, and located over a furnace provided with a hinged cover. Next I introduce the required amount of mercury and add a small percentage of cyanide of silver dissolved in ammonia, nitric acid, or cyanide of ammonia solution, the office of this solution being first to cleanse the particles of precious metal, and then to coat them with silver, which I have found materially aids amalgamation. A fire is then made in the furnace under the vessel and a rotating motion imparted thereto, in order that its entire exterior surface may be heated to a uniform degree, the revolution of the vessel serving to agitate and mix and thoroughly incorporate its contents, while the vaporized mercury penetrates and thoroughly leaches and amalgamates the metal in the ore. The cover of the furnace is now thrown back and the vessel removed from its bearings by a crane or other hoisting device, and is emptied before cooling, the pressure from the vaporized mercury being first relieved by drawing it off through a small pipe into a receptacle containing water. The vessel after being emptied, and while in its heated state being recharged, is returned to its position over the fire, and the operation continues as before.

From the foregoing it will be seen that the revolution of the mass prevents the possibility of burning the mercury, the removal and return of the vessel without waiting for it to cool economizes fuel, the employment of water and steam is dispensed with, and the construction of the apparatus is one of extreme simplicity.

The amalgamation of ores by the process above described is produced at a minimum cost, and for this reason poor grades of ores heretofore considered worthless and discarded may be profitably treated.

I am aware that cyanide of potassium has been employed in amalgamation, but experience teaches me that cyanide of silver is more effectual.

I claim—

The within-described process of separating metals from their ores, the same consisting of placing the ground or comminuted ore, mercury, and cyanide of silver solution in a closed vessel, then subjecting it to heat while being agitated, then removing the heated vessel and relieving the pressure, as described, and finally discharging the contents of the vessel and recharging it before allowing it to cool, substantially as set forth.

Witness my hand this 9th day of February, 1881.

EUGENE A. CROCKER.

In presence of—
N. W. STEARNS,
THEO. J. PEASE.